July 10, 1934. J. MÜLLER 1,966,102
APPARATUS FOR THE ELECTROLYTIC TREATMENT OF LIQUIDS
Filed May 21, 1931
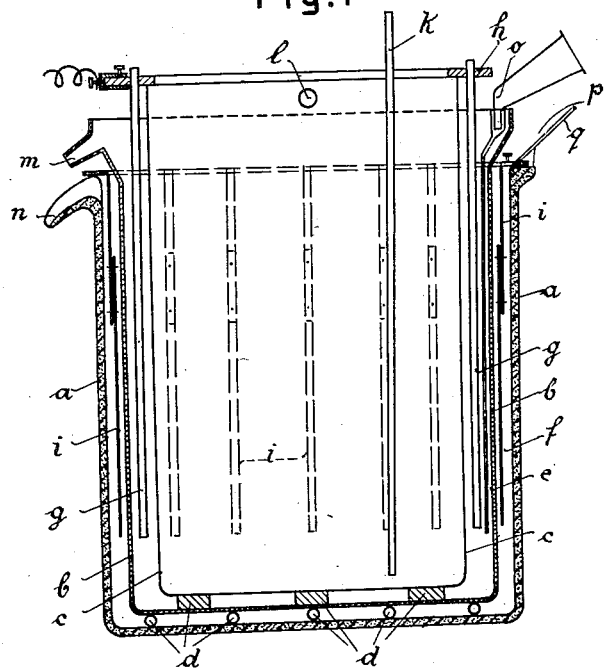
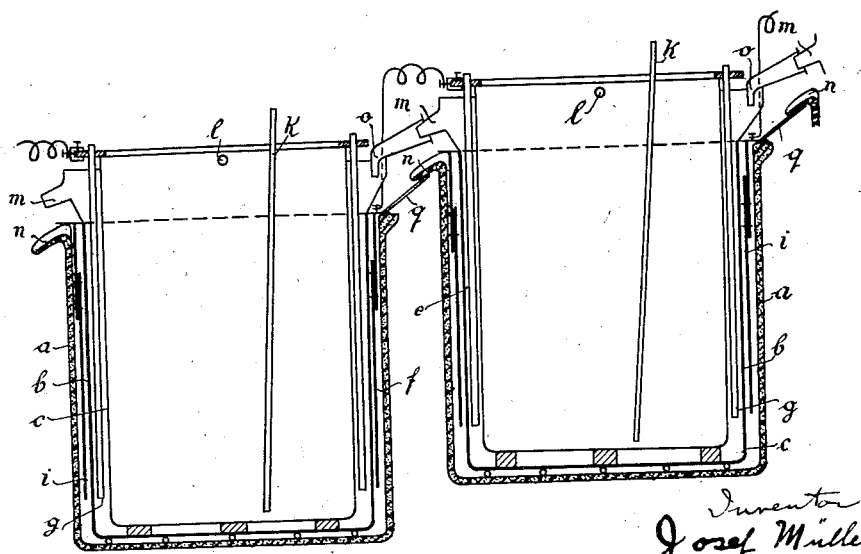

Patented July 10, 1934

1,966,102

UNITED STATES PATENT OFFICE 1,966,102

APPARATUS FOR THE ELECTROLYTIC TREATMENT OF LIQUIDS

Josef Müller, Weissenstein - above - the - Drau, Austria, assignor to Oesterreichische Chemische Werke Gesellschaft m. b. H., Vienna, Austria, a corporation of Austria Application May 21, 1931, Serial No. 539,077
In Austria August 18, 1930

3 Claims. (Cl. 204—9)

The invention relates to an apparatus for the electrolytic treatment of liquids, particularly for the electrolytic purification of hydrogen peroxide solutions. The apparatus according to the invention consists of a cell or a plurality of cells with electrode spaces separated from each other in known manner by a diaphragm, wherein the outer electrode space is formed by the diaphragm and the wall of the receptacle. The apparatus is characterized by the feature that both electrode spaces have the form of relatively narrow channels, the inner electrode space being rendered narrow by an immerged body nearly completely filling up its vertical section. The volume of the two electrode spaces may be the same. But for some purposes it may be recommended to choose the volume of the inner electrode space larger than that of the outer electrode space or vice versa. The receptacle may have a square, circular or oval transverse section. The diaphragm has preferably the form of a cylinder closed at the bottom.

The cathode is for example disposed in the inner electrode space. The immerged body forming the inner wall of the electrode space may be hollow in order to serve simultaneously as a cooler for which purpose a cooling liquid is supplied to it through a suitable feeding pipe and discharged through an outlet. Each cell is provided with means for introducing into the inner electrode space and into the outer electrode space the liquid to be treated and with suitable outlets for these liquids. In order to ensure that a hydrostatic pressure is exerted upon the liquid treated in the inner electrode space a diaphragm is chosen, which extends in height over the wall of the receptacle and the outlet for the liquid filling the inner electrode space is disposed higher than the outlet for the liquid filling the outer electrode space. The pressure exerted corresponds to the difference of the levels of the outlets.

By Figure 1 of the drawing an apparatus according to the invention is illustrated diagrammatically in vertical section by way of example. Figure 2 shows the connection of several cells.

Cooling water is introduced into the immerged body $c$ through a pipe $k$ reaching down nearly to the bottom of the body. By the outlet $l$ the cooling water can run off. The feeding of electrolyte into the inner electrode space $e$ takes place at $o$, that of the outer electrode space at $p$. $m$ is the outlet for the inner electrode space, $n$ that for the outer electrode space.

The immerged body may under certain circumstances be made of a metal resistant to the electrolyte, for instance of tin or of V2a—steel and may in such a case simultaneously serve as electrode.

For operation, the two electrode spaces are filled with the respective liquids. For the treatment of readily decomposable liquids it has proved advantageous to lead them continuously through the inner electrode space, if desirable in circulation, whilst the liquid in the outer electrode space is not moved, but without feeding is completed from outside by diffusion and electrolytic transport, so that the liquid will only slowly trickle off from the outer electrode space. If a plurality of cells are connected in form of cascades, the liquid flows from inner to inner electrode space through the outlets $m$, whilst the liquid in the outer electrode spaces will drop off from one outlet $n$ through channels $q$ into the next outer electrode space or is also led off separately.

In the receptacle $a$, made of a material resistant to the electrolyte, for instance earthenware, or provided with a lining of such resistant material, the diaphragm $b$ is placed and within the latter the immerging body $c$ which may e. g. consist of a hollow body of glass. The diaphragm consists of thin porous material, for instance unglazed porcelain, earthenware, gurocel (a product made from kieselguhr and water glass) or a tissue impregnated with artificial resins. The diaphragm and the immerged body are maintained in position by supporting plates $d$. The dimensions of the parts are to be so chosen that between the wall formed by the diaphragm and the wall of the receptacle on the one hand and between the wall of the immerged body and the wall of the diaphragm on the other, channels are formed, namely the inner electrode space $e$ and the outer electrode space $f$. The width of the channels constituting the electrode spaces may for instance amount from 5 to 20 millimeters. Satisfying results may, however, also be obtained with larger or narrower channels. In the inner electrode space the electrode $g$ is disposed, e. g. the cathode having the form of annularly arranged graphite rods conductively connected to each other and to the source of current by a metal ring $h$ (for instance made of aluminium). In the outer electrode space, the electrode $i$, e. g. the anode is placed which consists of platinum-tantalum strips.

What I claim is:—

1. Apparatus for the electrolytic treatment of liquids particularly for the electrolytic purification of hydrogen peroxide solutions consisting of a receptacle provided with an inlet and an outlet, an immerged body inserted in the receptacle, a diaphragm placed in the interspace between the walls of the receptacle and of the immerged body, thus being formed an outer space between the walls of the receptacle and the diaphragm and an inner space between the diaphragm and the walls of the immerged body, both these spaces being so chosen as to constitute narrow channels, the diaphragm being adapted to separate said narrow channels from each other, an anode in the form of strips provided in said outer space and a cathode in the form of rods arranged in said inner space.

2. Apparatus for the electrolytic treatment of liquids particularly for the electrolytic purification of hydrogen peroxide solutions consisting of a receptacle provided with an inlet and an outlet, an immerged body inserted in the receptacle, a diaphragm placed in the interspace between the walls of the receptacle and of the immerged body, thus being formed an outer space between the walls of the receptacle and the diaphragm and an inner space between the diaphragm and the walls of the immerged body, both these spaces being so chosen as to constitute narrow channels, the diaphragm being adapted to separate said narrow channels from each other, an anode consisting of platinum-tantalum strips and a cathode having the form of annularly arranged graphite rods, the anode being suspended on top of the receptacle and the cathode being secured to a holding means on top of the immerged body.

3. Apparatus for the electrolytic treatment of liquids particularly for the electrolytic purification of hydrogen peroxide solutions consisting of a receptacle provided with an inlet and an outlet, an immerged body of impermeable material inserted in the receptacle, a diaphragm placed in the interspace between the walls of the receptacle and of the immerged body, thus being formed an outer space between the walls of the receptacle and the diaphragm and an inner space between the diaphragm and the walls of the immerged body, both these spaces being so chosen as to constitute narrow channels, the diaphragm being adapted to separate said narrow channels from each other, a flat electrode inserted in said outer space, said immerged body being adapted to constitute the other electrode.

JOSEF MÜLLER.